United States Patent
Woollenweber et al.

(10) Patent No.: US 7,025,579 B2
(45) Date of Patent: Apr. 11, 2006

(54) BEARING SYSTEM FOR HIGH-SPEED ROTATING MACHINERY

(75) Inventors: William E. Woollenweber, Carlsbad, CA (US); Jon A. Meyer, Simi Valley, CA (US)

(73) Assignee: Innovative Turbo Systems Corporation, Simi Valley, CA (US)

( * ) Notice: Subject to any disclaimer, the term of this patent is extended or adjusted under 35 U.S.C. 154(b) by 42 days.

(21) Appl. No.: 10/736,094

(22) Filed: Dec. 15, 2003

(65) Prior Publication Data

US 2004/0200215 A1 Oct. 14, 2004

Related U.S. Application Data

(63) Continuation-in-part of application No. 09/978,935, filed on Oct. 16, 2001, now abandoned, and a continuation-in-part of application No. 10/158,310, filed on May 30, 2002, now Pat. No. 6,739,845, and a continuation-in-part of application No. 10/369,801, filed on Feb. 20, 2003, now Pat. No. 6,877,901.

(51) Int. Cl.
*F04B 17/00* (2006.01)
*F02B 33/44* (2006.01)
*F16C 19/04* (2006.01)
*F16C 27/00* (2006.01)

(52) U.S. Cl. .................. 417/407; 60/608; 384/492; 384/490; 384/99; 384/535; 384/901

(58) Field of Classification Search ............. 417/407; 60/608; 384/490, 492, 99, 535, 556, 517, 384/445; 415/111
See application file for complete search history.

(56) References Cited

U.S. PATENT DOCUMENTS

| | | | | |
|---|---|---|---|---|
| 2,492,672 | A | * | 12/1949 | Wood ..................... 417/407 |
| 2,534,142 | A |   | 12/1950 | Morton et al. ............. 384/535 |
| 3,061,386 | A |   | 10/1962 | Dix et al. ................. 384/535 |
| 3,096,126 | A |   | 7/1963 | Woolenweber, Jr. et al. |
| 3,258,199 | A |   | 6/1966 | Anderson ................ 417/407 |
| 3,390,926 | A |   | 7/1968 | Woollenweber, Jr. |
| 3,993,370 | A |   | 11/1976 | Woollenweber |
| 4,364,717 | A |   | 12/1982 | Schippers et al. ......... 417/407 |
| 4,370,106 | A |   | 1/1983 | Lauterbach ............... 384/445 |
| 4,641,977 | A |   | 2/1987 | Woollenweber ........... 417/407 |
| 4,789,253 | A |   | 12/1988 | Perego .................... 384/517 |
| 4,808,091 | A |   | 2/1989 | Ruetz ..................... 384/556 |
| 4,867,655 | A | * | 9/1989 | Barbic et al. ............. 417/407 |
| 4,979,881 | A | * | 12/1990 | Gutknecht ............... 417/407 |

(Continued)

FOREIGN PATENT DOCUMENTS

DE 3537449 A1 * 1/1987

(Continued)

*Primary Examiner*—Thai-Ba Trieu
(74) *Attorney, Agent, or Firm*—Kelly Lowry & Kelley, LLP

(57) ABSTRACT

A bearing system for a turbocharger shaft includes an elongated bearing carrier with two anti-friction ball bearings mounted in its ends and with a radially extending flange at one end that cooperates with stationary housing portions and carries thrust loads of the rotor in both directions. The elongated bearing carrier is supported within the housing by axially spaced elastic supports which permit the rotating assembly to rotate about its mass center and provide a shock and vibration cushion. The elongated bearing carrier and housing cooperate to provide a coolant cavity which communicates with the outside periphery of the elongated bearing carrier between the axially spaced elastic supports, which also act as coolant seals between the elongated bearing cavity and the bearing housing.

25 Claims, 2 Drawing Sheets

U.S. PATENT DOCUMENTS

| | | | |
|---|---|---|---|
| 5,522,667 A * | 6/1996 | Miyake | 384/492 |
| 6,032,466 A * | 3/2000 | Woollenweber et al. | 417/407 |
| 6,048,168 A * | 4/2000 | Sabini | 415/111 |
| 6,305,169 B1 * | 10/2001 | Mallof | 60/608 |
| 6,425,743 B1 * | 7/2002 | Fischer | 417/407 |
| 6,443,624 B1 * | 9/2002 | Knepper et al. | 384/492 |
| 6,735,945 B1 * | 5/2004 | Hall et al. | 60/608 |

FOREIGN PATENT DOCUMENTS

| | | | |
|---|---|---|---|
| JP | 01178723 A | * | 7/1989 |
| SU | 767471 | | 11/1978 |

* cited by examiner

BEARING SYSTEM FOR HIGH-SPEED ROTATING MACHINERY

RELATED APPLICATIONS

This application is a continuation-in-part of application Ser. No. 09/978,935, filed Oct. 16, 2001 now abandoned, application Ser. No. 10/158,310, filed May 30, 2002 now U.S. Pat. No. 6,739,845, and application Ser. No. 10/369,801, filed Feb. 20, 2003 now U.S. Pat. No. 6,877,901.

FIELD OF THE INVENTION

This invention relates to bearing systems for machinery with shafts that rotate at high speeds and are exposed at one end to high temperatures, such as turbochargers used on internal combustion engines.

BACKGROUND OF THE INVENTION

Turbochargers for internal combustion engines have been widely used on both diesel and gasoline engines for many years. A great deal of effort was expended in the early years of turbocharger development to produce a bearing system that exhibited sufficient durability to make a small size turbocharger commercially viable. Early attempts to use ball bearings were unsuccessful in that sufficient durability could not be achieved. Furthermore, bearing systems for small turbochargers must be capable of mass production manufacturing methods, be low in cost, and easily serviced in the field.

Research and development tests during the 1960's resulted in the perfection of floating sleeve-bearing systems that were capable of suppressing the problems of shaft instability, had acceptable friction losses and achieved satisfactory durability when used on a variety of internal combustion engine turbochargers. Several of these successful bearing systems are illustrated in U.S. Pat. Nos. 3,056,634; 3,096,126; 3,390,926; 3,993,370; and 4,641,977. The bearings of the patents listed above generally solved the stability problem by using a free-floating bushing between the rotating shaft and its stationary supporting member which was adapted to provide a film of lubrication between its inner surface and the rotating shaft and also between its outer surface and the stationary supporting member. In these systems, the free-floating bushings were free to rotate, but at speeds only a fraction of the speed of the rotating shaft and were free to move radially in order to allow the rotating assembly to find and rotate about its center of mass. The inner and outer oil films provided the necessary lubrication to prevent wear and provided a cushion against vibration and shock loads.

In the sleeve bearing systems described above, it was necessary to provide a thrust bearing to sustain the axial loads imposed on the rotating assembly by the actions of the compressor and turbine wheels used in the turbochargers, and a collar was provided on the rotating shaft to bear against a stationary thrust member. However, the high rotational speed of the collar attached to the shaft resulted in a high thrust frictional loss which, in addition to the frictional losses of the sleeve bearings, resulted in a substantial total frictional loss for the complete bearing system.

Since it is advantageous to have a bearing system that has a high mechanical efficiency, the use of anti-friction bearings in high-speed machines such as turbochargers is advisable. U.S. Pat. No. 4,370,106 discloses a bearing system for a turbocharger rotor consisting of an anti-friction ball bearing at its compressor end and a sleeve bearing at its turbine end. In this system, both the anti-friction bearing and the sleeve bearing are mounted in a non-rotating elongated cylinder. The cylinder containing the ball and sleeve bearings is prevented from rotating by a square portion at the compressor end that engages stops in the stationary housing member. Lubricant is provided between the non-rotating cylinder and the supporting housing to provide damping for eccentric motion of the rotor due to residual unbalance. In this bearing system, however, the differential speed between the sleeve bearing and rotor is the very high rotative speed of the rotor. Since sleeve bearing frictional losses are proportional to the square of the differential rotating speed, this system has an inherent higher frictional loss than a full-floating sleeve bearing system. Also, since the non-rotating cylinder that contains the bearings must engage the stationary housing member, it carries the full thrust load of the rotor. The residual imbalance in the rotor forces the non-rotating cylinder to move orbitally, causing the mating surfaces to be subject to fretting. Thus a solid film lubricant must be placed between the mating surfaces to mitigate the fretting problem; however, this problem remains an inherent disadvantage with this type of non-rotating cylinder system and contributes to a limited service life in the field.

The fretting problem inherent with non-rotating systems that are allowed to move radially is solved in the bearing system disclosed in U.S. Pat. No. 4,641,977. In this bearing system, a ball bearing is mounted in an elongated cylinder that has a radially extending flange at one end. The elongated cylinder is free to move radially to a limited degree and free to rotate in the stationary supporting member. The radially extending flange engages the stationary housing to carry the thrust load of the rotor. However, since the elongated cylinder rotates at relatively low speeds, the thrust losses are minimal. In this bearing system, a full-floating sleeve bearing is located at the opposite end of the elongated cylinder to complete the bearing system for carrying the rotor. The frictional losses with this system are reduced due to the ball bearing and floating sleeve bearing, and the mechanical efficiency of the system is relatively high compared to prior bearing systems.

Continued development work has resulted in the systems described in my pending patent application Ser. No. 10/369,801, filed Feb. 20, 2003, which is a continuation-in-part of patent application Ser. No. 09/978,935, filed Oct. 16, 2001. The system described in these patent applications comprises a bearing system with an angular contact ball bearing in each end of a rotatable elongated cylinder that has a radially extending flange at one end and is carried by a stationary bearing housing. Each angular contact ball bearing carries thrust in one direction only, the directions being opposite to one another. The radially extending flange on the end of the rotatable elongated cylinder engages the stationary bearing housing to carry the thrust load of the rotor in both directions. The rotatable elongated cylinder is supplied with a lubricant between its outer diameter and the stationary bearing housing, and this lubricant provides a shock and vibration cushion for the rotating assembly. The rotatable elongated cylinder is provided with passageways that carry the lubricant from its outer surface to the angular contact ball bearings in the ends of the cylinder. A tolerance bearing ring is used between the outer race of the turbine end ball bearing and the stationary bearing housing to allow axial movement of the bearing due to axial expansion of the shaft when heated, while at the same time preventing rotation of the outer race in the housing.

This bearing system has proven to be very satisfactory for commercial use in high-speed turbochargers; however, it requires a supply of pressurized lubricant from the engine lubricating system and, historically, the use of lubricating oil in turbochargers has given rise to a number of operational problems.

To prevent oil leakage into the compressor casing and turbine casings, piston ring seals are employed in commercial turbochargers. Since the piston rings are not positive contact seals, there is a small leak path around the piston rings and, during certain operating conditions of the engine, leakage can occur. Any leakage of lube oil into the turbine casing of the turbocharger can contribute to undesirable emissions in the engine exhaust. Oil leakage into the compressor casing gets carried into the engine intake system and is subsequently burned in the engine cylinder. This also can create undesirable emissions in the engine exhaust.

In addition, in cold weather, there can be a significant lag in providing a satisfactory flow of lubricant to the turbocharger bearings when the engine is initially started. This lag can contribute to failure of the bearings where excessive time is required for the cold viscous lubricant to reach the turbocharger bearings.

Another problem arises when an engine is shut down after being operated at high load where the exhaust gas temperatures are very high. Heat can be transferred into the turbocharger bearing housing from the hot exhaust manifold, and residual oil in the turbocharger bearing housing can carbonize. This carbonization build-up can eventually lead to failure of the bearing system.

Finally, there is the cost of the mechanical features involved in piping lube oil from the engine to the turbocharger oil inlet and piping the expended lube oil to the engine crankcase.

BRIEF SUMMARY OF THE INVENTION

The invention provides a bearing system for high speed rotating machinery, such as turbochargers for internal combustion engines, that can provide extremely low losses through the use of antifriction ball bearings, can eliminate the need for lubricating oil from the internal combustion engine, accommodate shock and vibration loads, and can be maintained at substantially lower operating temperatures than prior bearing systems.

In one aspect of the invention, the bearing system for the rotating assembly and the housing that carries it combine to form a coolant cavity by an elongated bearing carrier whose outer surface forms one surface defining the coolant cavity and is sealed with the housing by an elastomeric band on each side of the surface defining the coolant cavity between the outside surface of the elongated bearing carrier and the housing. The elastomeric bands also support the bearing system, allowing the rotating assembly to rotate about its mass center and dampening any shock and vibration loads imposed on the bearing system. Preferably, the elongated bearing carrier has a cylindrical outside surface with peripheral O-ring grooves formed on each side of the coolant cavity forming surface and the elastomeric bands are O-rings seated in the peripheral grooves.

In another aspect, the invention comprises a bearing system for a rotating assembly carried by a housing, for example, as in a turbocharger and includes: an elongated bearing carrier removably supported within the housing by a plurality of elastic elements surrounding the elongated bearing carrier, with at least one elastic element being located adjacent each end of the elongated bearing carrier between the elongated bearing carrier and the housing; and a pair of angular contact anti-friction ball bearings carried within the elongated bearing carrier, the inner races of the anti-friction bearings rotatably carrying the rotating assembly, with one of the pair of angular contact anti-friction bearings being carried adjacent each end of the elongated bearing carrier and carrying thrust in one direction, the direction of the thrust being carried by each angular contact ball bearing the opposite of the direction of the thrust being carried by the other angular contact ball bearing. Preferably, the housing forms a coolant cavity in contact with an elongated cylindrical bearing carrier, the plastic elements are O-rings, and the coolant cavity is sealed by O-rings, whereby heat is transferred from said rotating assembly and angular contact anti-friction bearings to coolant supplied to said coolant cavity. In addition, the elongated cylindrical bearing carrier can include outwardly projecting flange surfaces, the housing can provide surfaces adjacent the outwardly projecting flange surfaces, and an anti-friction material can be located between the outwardly projecting flange surfaces and the housing surfaces, the outwardly projecting flange surfaces and housing surfaces cooperating to bear thrust loads of the rotating assembly.

Bearing systems of the invention can comprise a double ball bearing system that includes two angular contact, anti-friction ball bearings mounted in opposite ends of an elongated cylinder, each carrying thrust in one direction only. The elongated cylinder can include a radially extending flange at one end that engages stationary housing members to carry the thrust load of the rotating assembly in both directions. The elongated cylinder can be supplied with two circumferential grooves, each of which carries an elastic member, such as an O-ring. These elastic members can be made of a temperature resistant rubber such as Viton. This elongated cylinder, containing the angular contact anti-friction ball bearings and O-ring seals can be insertable into a bore in a turbocharger bearing housing that is provided with an annular coolant water jacket that surrounds the elongated cylinder so the outside diameter of the elongated cylinder, when inserted into the bearing housing, forms the inner boundary of the coolant water jacket and the elastic members act as seals for closure of the coolant water passage. The unique arrangement of these components allows coolant to flow over the middle portion of the elongated cylinder, thus providing cooling for both the anti-friction ball bearings and the O-ring seals. In this bearing system, the O-ring elastic members also act as radial springs and allow minor orbital excursions of the elongated cylinder that occur as a result of residual unbalance in the rotating assembly, thus allowing the rotor to rotate about its mass center.

A preferred embodiment of this invention is one where the anti-friction ball bearings are of the full complement type that do not use a cage to space the balls. The use of ceramic balls is also preferred due to their light weight when compared with steel balls. The use of ceramic balls without a cage allows the bearings to operate very satisfactorily at the very high speeds attained by the turbocharger rotor when operating on an internal combustion engine.

The invention thus provides a bearing system for a turbocharger that does not require a supply of pressurized lube oil from the engine on which it is mounted, a bearing system which eliminates a possible source of undesirable engine exhaust emissions by eliminating lube oil leakage from the turbocharger, a bearing system wherein the mechanical efficiency is maximized, a bearing system that, due to minimal friction losses, allows rapid acceleration of the turbocharger rotor, thus producing a rapid supply of combustion air to the engine cylinders when the engine is accelerated under load, and a bearing system that will operate at lower temperatures and be more reliable.

This invention also permits problems and complications of motor-assisted turbocharger systems to be overcome by mounting a motor-generator at the intake of the compressor of the turbocharger where it is cooled by the intake air stream. The motor-generator rotor can be connected to the turbocharger rotor by a permanent connector that stays engaged throughout the entire operating speed range of the turbocharger. The electronic control for the motor-generator, which acts to energize the motor from battery power during the engine acceleration period, can be mounted at the intake of the compressor, benefiting from intake air-cooling. At high engine speeds, the control allows the motor to become a generator when excess energy is available in the engine exhaust gas.

BEST MODE FOR CARRYING OUT THE INVENTION

The bearing system of this invention is adapted to support, within a stationary element of a machine, a high-speed rotating shaft. A turbocharger 10, as illustrated in FIG. 1, is one example of a machine in which the invention may be advantageously employed, and the more detailed description of the invention that follows is in the context of the turbocharger, as illustrated in FIG. 1, and a motor-assisted turbocharger, as illustrated in FIG. 2.

Figure 1:
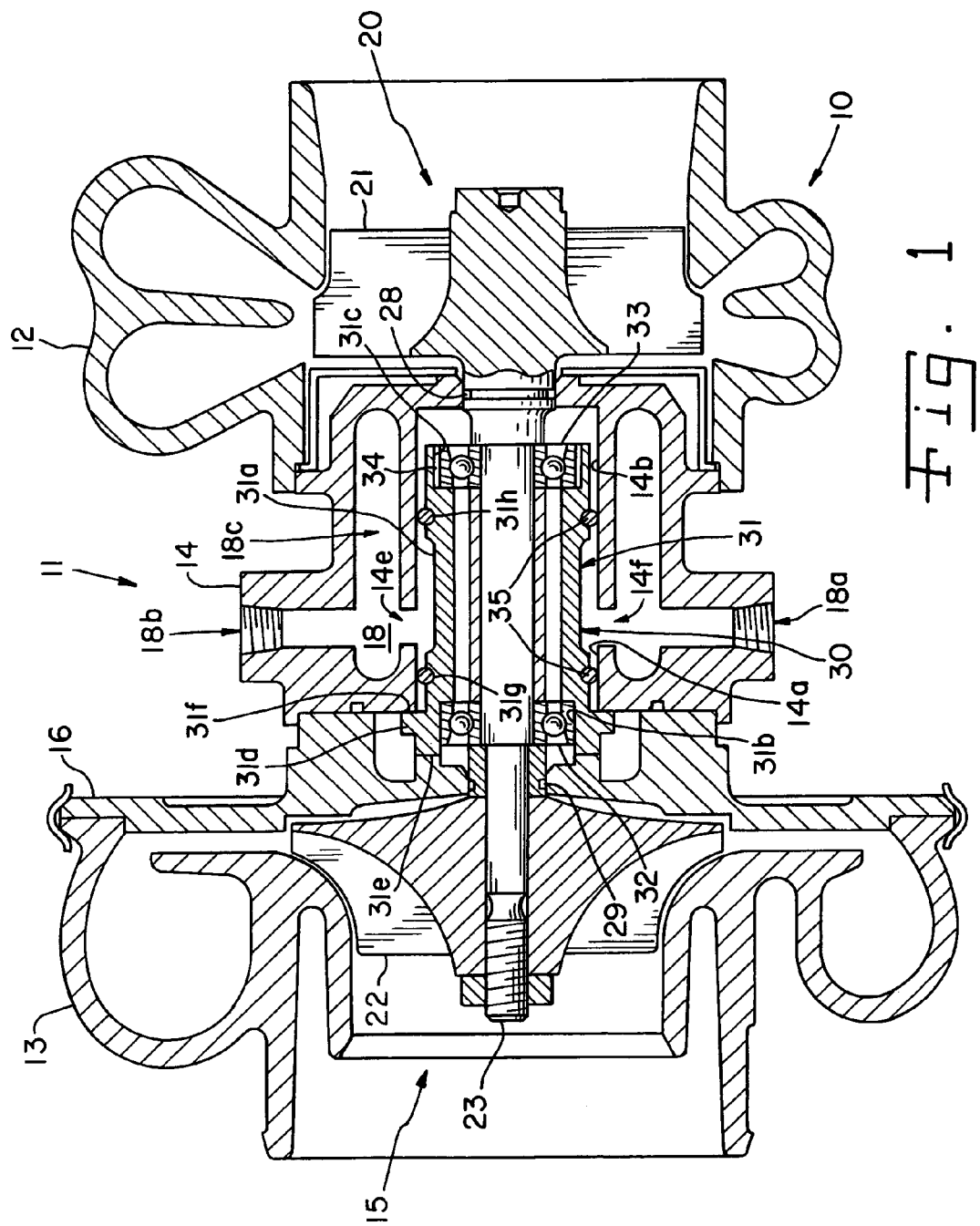
FIG. 1 is a cross-sectional view taken along a plane through the axis of rotation of a turbocharger utilizing this invention.
Figure 2:
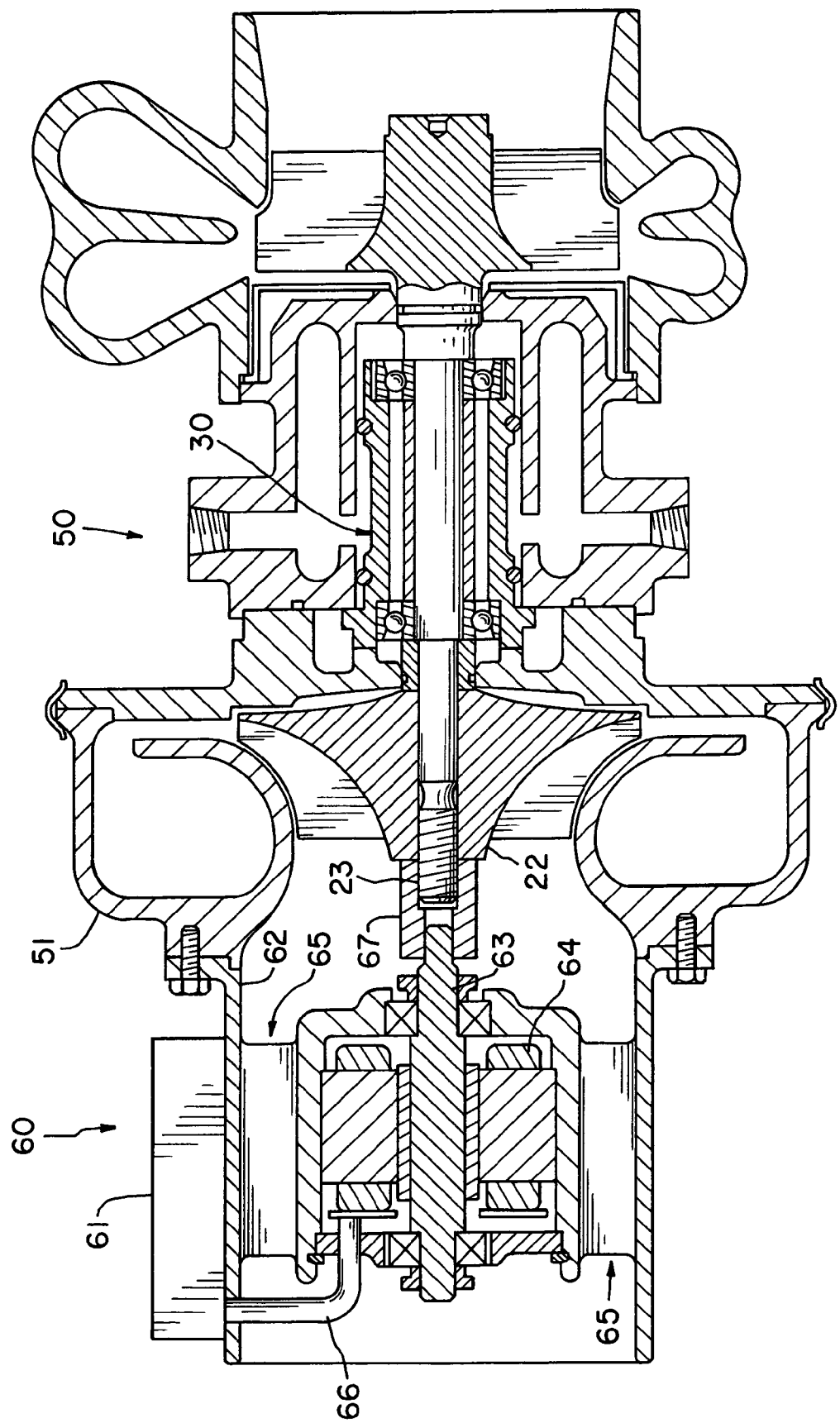
FIG. 2 is a cross-sectional view taken along a plane through the axis of rotation of a unit of this invention, including a turbocharger and an electric motor-generator.

As set forth above, FIG. 1 illustrates a turbocharger 10 of the type that is frequently used to supply charge air to the cylinders of an internal combustion engine. As well known in the art, the turbocharger 10 has a stationary housing 11, comprised of an exhaust gas volute 12, a compressor casing 13 and bearing housing 14 that encompasses the rotating assembly 20. The rotating assembly 20 is driven by the action of exhaust gas from an internal combustion engine (not shown) directed from the exhaust gas volute through the turbine wheel 21 of the rotating assembly. Rotation of the turbine wheel 21 drives the compressor wheel 22 of the turbocharger through a rotatable shaft 23, each of which is carried, within the stationary housing 11 of turbocharger 10, by a bearing system 30 of the invention. The compressor wheel 22, when rotating, draws air into the air inlet 15, and directs compressed air through the compressor casing 13 to the cylinders of the internal combustion engine. The bearing system 30 of the invention carries the rotating shaft 23 and is carried by the bearing housing 14. As well known in the art, the shafts of turbochargers have rotating speeds of up to and exceeding 200,000 rpm and are exposed to high temperatures of engine exhaust gases at their turbine ends.

The bearing system 30 of this invention that is illustrated in FIG. 1 comprises an elongated bearing carrier 31 that carries a pair of anti-friction ball bearings 32, 33 by engagement with their outer races, with one anti-friction ball bearing 32 at its turbine end and another anti-friction ball bearing 33 at its compressor end. The rotatable shaft 23 is carried by the inner races of the anti-friction bearings 32, 33. In one preferred embodiment of this invention, the anti-friction ball bearings 32, 33 may be of the angular contact type and are adapted to carry thrust in one direction only. For example, an angular contact ball bearing 32 will carry the thrust of the rotating assembly when it is acting toward the compressor, and an angular contact ball bearing 33 will carry thrust of the rotating assembly when it is acting toward the turbine end.

As illustrated in FIG. 1, the elongated bearing carrier 31 preferably comprises an elongated cylinder having an outer surface 31a, which is preferably cylindrical, and an inner bore. The anti-friction ball bearing 32 has its outer race pressed into bore portion 31b at the compressor end of the elongated bearing carrier 31. The anti-friction ball bearing 33 at the turbine end of the elongated bearing carrier 31 is provided with a tolerance ring 34 between its outer race and a bore portion 31c in the turbine end of elongated bearing carrier 31. The tolerance ring 34 prevents the outer race of the anti-friction bearing 33 from rotating in the elongated bearing carrier 31 by virtue of its engagement with bore portion 31c, but still allows the outer race of bearing 33 to move axially when the shaft 23 is exposed to hot exhaust gas temperatures at its turbine end.

The compressor end of the elongated bearing carrier 31 has an outwardly projecting flange 31d that forms two thrust-carrying surfaces 31e and 31f. Surface 31e cooperates with an adjacent thrust-bearing surface on end plate 16 of the stationary housing 11 and surface 31f cooperates with an adjacent thrust-bearing on bearing housing 14. Both surfaces 31e and 31f may be provided with an anti-friction material or coating to prevent fretting of the surfaces due to the small orbital motion of the elongated bearing carrier 31 that may be generated by residual imbalance in the rotating assembly 20.

As illustrated in FIG. 1, the elongated bearing carrier 31 is supported within the bearing housing 14 by a plurality of elastic supports 35, which are preferably elastomeric bands around the peripheral outside surface of the elongated bearing carrier 31 that engage the outer surface 31a of the elongated bearing carrier and inner walls 14a, 14b of the bearing housing 14. The elastic supports 35 act as radial springs and allow minor orbital motion of the bearing system 30 that may result from any residual imbalance of the rotating assembly 20, thus allowing the rotating assembly 20 to rotate about its mass center. The elastic supports 35 also cushion the rotating assembly 20 and bearing system 30 from shock and vibration loading.

In the preferred embodiment illustrated in FIG. 1, the outer surface 31a of the elongated bearing carrier 31 may include two circumferential grooves 31g and 31h, that are spaced apart axially and carry the elastic members 35, which may be O-rings seated in the circumferential grooves 31g, 31h. The elasticity of elastic members 35 allow the elongated bearing carrier 31 to move radially in response to residual unbalance in the rotating assembly, while at the same time preventing the elongated bearing carrier 31 from rotating in the bearing housing bore 14a, 14b. Thus, the elastic members 35, which may be O-rings, act as radial springs and, at the same time, cushion the rotating assembly and bearing system 20 from shock and vibration loading.

As illustrated in FIG. 1, the bearing housing 14 includes a coolant cavity 18, including coolant water jacket 18c for coolant to carry away heat transferred to the bearing housing 14 and bearing system 30 from the hot turbine parts of the turbocharger. The coolant cavity 18 has an inlet 18a that may be connected to the cooling system of an internal combustion engine, and an outlet 18b that carries coolant from the water jacket 18 and returns it to the cooling system of the engine.

As further illustrated by FIG. 1, in one aspect of the invention, the bearing system 30 for the rotating assembly 20 and the bearing housing 14 combine to form the coolant cavity 18 by the elongated bearing carrier 31, whose outer surface 31a forms one surface defining the coolant cavity 18 and is sealed with walls 14a and 14b of the bearing housing 14 by the elastomeric bands 35 between the outside surface 31a of the elongated bearing carrier and the walls 14a, 14b of bearing housing 14 on each side of the surface portion defining the coolant cavity. As indicated above, the elastomeric bands 35 also carry the bearing system 31, allowing the rotating assembly 20 to rotate about its mass center and cushioning the bearing system 30 and rotating assembly 20 from shock and vibration. In the illustrated preferred embodiment, the elongated bearing carrier 31 has a cylindrical outside surface 31a with peripheral O-ring grooves 31g, 31h formed on each side of the portion of surface 31a that forms the coolant cavity 18, and the elastomeric bands 35 are O-rings seated in the peripheral grooves.

The bearing housing 14 has openings 14e and 14f, which allow coolant to flow through a water jacket portion 18c of the bearing housing 14 and circulate around the elongated bearing carrier 31 and carry away heat transferred to and generated in the bearing system 30. Elastic members 35 seal off the coolant passage and prevent coolant leakage into the adjacent areas surrounding the elongated cylinder 31. Elastic members 35 are preferably of a high temperature rubber compound, such as Viton and may be Viton O-rings. The flow of coolant through the coolant cavity 18 protects the bearing system 30 and elastic members 35 from heat transfer from the hot turbine casing 12 and hot turbine wheel 21. A piston ring seal 28 prevents hot gas from entering the bearing system cavity and a second piston ring seal 29 prevents compressed air from entering the bearing system cavity.

In another aspect of the invention, the elongated bearing carrier 31 is removably supported within the bearing housing 14 by a plurality of elastic elements 35 surrounding the elongated bearing carrier 31, with at least one elastic element 35 being adjacent each end of the elongated bearing carrier 31 between the elongated bearing carrier 31 and the bearing housing 14, and a pair of angular contact anti-friction bearings 32, 33 is carried within the elongated cylindrical bearing carrier 31, by their outer races, their inner races rotatably carrying the rotating assembly 20, with one of the pair of angular contact anti-friction bearings 32, 33 being carried adjacent each end of the elongated bearing carrier 31 and carrying thrust in one direction, the direction of the thrust being carried by each angular contact ball bearing 32, 33 being the opposite of the direction of the thrust being carried by the other angular contact ball bearing. Further, the elongated bearing carrier 31 preferably has an outwardly projecting flange 31d with a pair of thrust-bearing surfaces 31e, 31f that cooperate with adjacent surfaces of the stationary housing 11 to bear any thrust loads of the rotating assembly 20.

This invention allows a turbocharger, as illustrated in FIG. 1, to be manufactured more economically than the more complicated structures used in current commercial turbochargers.

The advantages of turbochargers using this invention can include:
1. Maximal mechanical efficiency due to the use of anti-friction ball bearings.
2. Elimination of the use of engine lubricating oil, which eliminates oil leakage problems prevalent in current commercial turbochargers; eliminates bearing failures due to oil lag when starting in cold weather and eliminates oil carbonization that can occur when the engine is shut down hot.
3. Exceptional cooling of a turbocharger by a coolant cavity that prevents excessive heat transfer from the hot turbine parts into the bearing housing and provides direct coolant flow contact with the turbocharger bearing system to carry away heat transferred to and generated in the bearing system when running at ultra high speed.
4. The use of angular contact anti-friction bearings with a full complement of ceramic balls which permit satisfactory operation at ultra-high speeds at reasonable in cost due to the absence of a cage used in more conventional ball bearings.
5. The use of elastic supports separating an elongated bearing carrier from contact with the bearing housing bore and serving the multiple purposes of allowing minor radial movement of the bearing system, providing shock and vibration protection for the bearing system and sealing a coolant passage around the periphery of the elongated cylinder.
6. Simplicity of mechanical design which allows economy of manufacture.

FIG. 2 illustrates a motor-assisted turbocharger 50, using the bearing system 30 of the invention, whose rotatable shaft 23 is connected at its compressor end to an externally mounted motor-generator 60, which has its electronic control 61 mounted directly on a motor housing 62. The motor-generator 60 depicted in FIG. 2 has a permanent magnet rotor 63 and wire-wound coil stator 64, which are well known in the art. The motor housing 62 is mounted directly on a modified compressor casing 51 and incorporates air passages 65 that receive ambient air from an air-cleaning device and directs it into the compressor wheel 22. The electronic control 61 for the motor-generator 60, whose circuitry is well known in the art, is connected to the motor-generator stator 64 by the short cables 66. Flexible coupling 67 connects the turbocharger shaft 23 to the rotor 63 of the motor-generator 60, and they remain connected throughout the entire operating speed range of the turbocharger.

The electronic control 61, mounted on the motor housing 62, energizes the motor from battery power during the acceleration period of an internal combustion engine. The electronic control 61 allows the conversion of the motor-generator 60 to a generator at higher engine speeds when excess energy is available in the engine exhaust gas flow. In current turbocharged engines, a waste gate or bypass valve is provided in the turbine casing to bypass excess energy in the exhaust gas, preventing the turbocharger rotor from exceeding its speed limits and wasting available excess energy in the exhaust gas. This invention utilizes the available excess energy by generating electric current, which can be fed back into the vehicle electrical system and utilized, for example, to change batteries.

The unique method of mounting the motor-generator 60 on the compressor casing allows it to be surrounded by annular intake air passages 65, and this provides cooling of the motor-generator components. Mounting the electronic control 61 on the motor housing 62 provides a means of cooling for the electronic control components.

By externally mounting the motor-generator 60 ahead of the turbocharger compressor in the cool intake air stream, the motor-generator 60 can be made appreciably larger than those designed within a turbocharger structure and can provide much more power to the turbocharger rotor during acceleration. Thus, the unique arrangement disclosed in this invention overcomes the complication of mounting a separate motor-driven compressor with bypass valve in the engine air intake piping, mounts the control close to the motor, thereby making the electric lead wires between the control and motor as short as possible, and provides all of the benefits described above for the bearing systems of the invention. The compact simplicity such a motor-assisted turbocharger provides a combination of all essential elements of a charging system in a single device that results in a less costly, better performing, and more efficient system when compared with other alternatives.

While we have shown and described present preferred embodiments of the invention, other embodiments may be devised without departing from the scope of the following claims.

It is therefore intended that the foregoing detailed description be regarded as illustrative rather than limiting, and that it be understood that it is the following claims, including all equivalents, that are intended to define the spirit and scope of this invention.

The invention claimed is:

1. In a bearing system for a rotating assembly carried by a housing of a turbocharger for an internal combustion engine, the improvement wherein the bearing system and housing combine to form a coolant cavity by a removable elongated bearing carrier whose outer surface forms one surface defining the coolant cavity and is sealed with said housing by an elastomeric band on each side of said one surface, said elastomeric bands also carrying and cushioning the bearing system and rotating assembly from shock and vibration loads;

said elongated bearing carrier including outwardly projecting flange surfaces, said housing has surfaces adjacent the outwardly projecting flange surfaces of the elongated bearing carrier, said outwardly projecting flange surfaces and the adjacent housing surfaces cooperating to bear thrust loads of the rotating assembly.

2. The improvement of claim 1 wherein said removable elongated bearing carrier has a cylindrical outside surface with a peripheral O-ring groove formed on each side of said one surface, and said elastomeric bands are O-rings seated in said peripheral grooves.

3. The improvement of claim 1 further including an anti-friction material located between said outwardly projecting flange surfaces of said bearing carrier and the housing surfaces.

4. In a bearing system for a rotating assembly carried by a housing of a turbocharger for an internal combustion engine, the improvement comprising an elongated cylindrical bearing carrier removably supported within the housing by a pair of elastomeric bands surrounding the elongated cylindrical bearing carrier, with one elastomeric band being located adjacent each end of the elongated cylindrical bearing carrier between the elongated cylindrical bearing carrier and the housing, a pair of angular contact anti-friction bearings with a full complement of ceramic balls carried within the elongated cylindrical bearing carrier by their outer races, their inner races rotatably carrying the rotating assembly, with one of the pair of angular contact anti-friction bearings being carried adjacent each end of the elongated cylindrical bearing carrier and carrying thrust in one direction, the direction of the thrust being carried by each angular contact ball bearing being the opposite of the direction of the thrust being carried by the other angular contact ball bearing.

5. The improvement of claim 4, wherein the housing forms a coolant cavity in contact with the elongated cylindrical bearing carrier, said coolant cavity being sealed by said pair of elastomeric bands, whereby heat is transferred from said rotating assembly and angular contact anti-friction bearing to coolant supplied to said coolant cavity.

6. The improvement of claim 5 wherein the elongated cylindrical bearing carrier has a cylindrical outside surface with a pair of peripheral grooves, one peripheral groove being formed adjacent each of the ends of the elongated cylindrical bearing carrier, and the pair of elastomeric bands comprise O-rings seated in the pair of peripheral grooves, engaging the housing and sealing the coolant cavity.

7. A bearing system for a shaft rotating at high speeds about an axis of rotation comprising:

an elongated cylinder having a cylindrical outside surface, a central bore and an outwardly projecting annular flange for forming a pair of thrust-bearing surfaces, a first anti-friction ball bearing in the central bore at one end of the elongated cylinder; a second anti-friction ball bearing in the central bore at the opposite end of the elongated cylinder; two peripheral grooves spaced axially apart around the cylindrical outside surface; two elastic members with each elastic member being carried in one of the peripheral grooves; and a spacer between the inner races of said anti-friction ball bearings, the inner races of said anti-friction ball bearings carrying said shaft.

8. The bearing system as in claim 7, wherein the outwardly projecting annular flange surfaces are provided with an anti-friction material.

9. The bearing system as in claim 7, wherein the anti-friction ball bearings are angular contact ball bearings that accept thrust in one direction only.

10. The bearing system as in claim 9, wherein the angular contact ball bearings comprises full complement ball bearings.

11. The bearing system as in claim 7, wherein the anti-friction ball bearings comprise ceramic balls.

12. The bearing system as in claim 7, wherein the anti-friction ball bearings comprise angular contact ball bearings carrying a full complement of ceramic balls.

13. The bearing system as in claim 7, wherein the anti-friction ball bearing on one end of the elongated cylinder is mounted in a tolerance ring that surrounds the outside diameter of the anti-friction ball bearing.

14. A turbocharger for an internal combustion engine, comprising:

a rotating assembly comprising a turbine wheel and a compressor wheel carried at the opposite ends of a shaft, a stationary housing comprising an exhaust gas volute for directing engine exhaust gas through said turbine wheel to rotate the rotating assembly, a compressor casing for collection of compressed air from the compressor wheel and a bearing housing, and a bearing system for rotatably carrying said rotating assembly within the stationary housing, said bearing system comprising an elongated bearing carrier removably supported by a plurality of elastic elements between the elongated bearing carrier and said bearing housing, and a pair of anti-friction ball bearings, one anti-friction ball bearing being axially spaced and carried by the elongated bearing carrier adjacent each of its ends, said pair of anti-friction ball bearings being engaged with said shaft and rotatably carrying said rotating assembly within said stationary housing;

said anti-friction ball bearings comprising angular contact ball bearings that accept thrust in one direction only.

15. The turbocharger as in claim 14, wherein the angular contact ball bearings comprises full complement ball bearings.

16. A turbocharger for an internal combustion engine, comprising:

a rotating assembly comprising a turbine wheel and a compressor wheel carried at the opposite ends of a shaft, a stationary housing comprising an exhaust gas volute for directing engine exhaust gas through said turbine wheel to rotate the rotating assembly, a compressor casing for collection of compressed air from the compressor wheel and a bearing housing, and a bearing system for rotatably carrying said rotating assembly within the stationary housing, said bearing system comprising an elongated bearing carrier removably supported by a plurality of elastic elements between the elongated bearing carrier and said bearing housing, and a pair of anti-friction ball bearings, one anti-friction ball bearing being axially spaced and carried by the elongated bearing carrier adjacent each of its ends, said pair of anti-friction ball bearings being engaged with said shaft and rotatably carrying said rotating assembly within said stationary housing;

said anti-friction ball bearing on one end of the elongated cylinder is mounted in a tolerance ring that surrounds the outside diameter of the anti-friction ball bearing.

17. A turbocharger for an internal combustion engine, comprising:

a rotating assembly comprising a turbine wheel and a compressor wheel carried at the opposite ends of a shaft, a stationary housing comprising an exhaust gas volute for directing engine exhaust gas through said turbine wheel to rotate the rotating assembly, a compressor casing for collection of compressed air from the compressor wheel and a bearing housing, and a bearing system for rotatably carrying said rotating assembly within the stationary housing, said bearing system comprising an elongated bearing carrier removably supported by a plurality of elastic elements between the elongated bearing carrier and said bearing housing, and a pair of anti-friction ball bearings, one anti-friction ball bearing being axially spaced and carried by the elongated bearing carrier adjacent each of its ends, said pair of anti-friction ball bearings being engaged with said shaft and rotatably carrying said rotating assembly within said stationary housing;

said elongated bearing carrier including outwardly projecting flange surfaces, said stationary housing has surfaces adjacent the outwardly projecting flange surfaces of the elongated bearing carrier, and an anti-friction material is located between the outwardly projecting flange surfaces and the stationary housing surfaces, said outwardly projecting flange surfaces and the adjacent housing surface cooperating to bear thrust loads of the rotating assembly.

18. A turbocharger for an internal combustion engine, comprising:

a rotating assembly comprising a turbine wheel and a compressor wheel carried at the opposite ends of a shaft, a stationary housing comprising an exhaust gas volute for directing engine exhaust gas through said turbine wheel to rotate the rotating assembly, a compressor casing for collection of compressed air from the compressor wheel and a bearing housing, and a bearing system for rotatably carrying said rotating assembly within the stationary housing, said bearing system comprising an elongated bearing carrier removably supported by a plurality of elastic elements between the elongated bearing carrier and said bearing housing, and a pair of anti-friction ball bearings, one anti-friction ball bearing being axially spaced and carried by the elongated bearing carrier adjacent each of its ends, said pair of anti-friction ball bearings being engaged with said shaft and rotatably carrying said rotating assembly within said stationary housing;

said bearing housing and elongated bearing carrier forming a coolant cavity sealed between the bearing housing and elongated bearing carrier by the plurality of elastic elements, whereby coolant circulated through said coolant cavity in contact with said elongated bearing carrier removes heat from the rotating assembly and anti-friction ball bearings;

said elongated bearing carrier further including outwardly projecting flange surfaces, said stationary housing has surfaces adjacent the outwardly projecting flange surfaces of the elongated bearing carrier, said outwardly projecting flange surfaces and the adjacent housing surfaces cooperating to bear thrust loads of the rotating assembly.

19. The turbocharger as in claim 18, wherein the bearing housing contains an annular coolant water passage that communicates with the outside surface of the elongated bearing carrier and has an inlet and outlet for admitting and expelling engine coolant.

20. The turbocharger as in claim 18, wherein the anti-friction ball bearings comprise ceramic balls.

21. The turbocharger as in claim 18, wherein the anti-friction ball bearings comprise angular contact ball bearings carrying a full complement of ceramic balls.

22. The turbocharger of claim 18, further comprising an electric motor-generator having a motor housing connected to and carried by a compressor casing and a motor generator rotor connected to the turbocharger shaft.

23. The turbocharger of claim 22, wherein the motor housing forms an inlet to the compressor wheel of the turbocharger with surfaces in heat transfer relationship with the motor components and electronic control.

24. The turbocharger of claim 18 wherein said elongated bearing carrier has a cylindrical outer surface, and said plurality of elastic supports are a pair of O-rings, one O-ring surrounding the cylindrical outer surface of the elongated bearing carrier adjacent each of its ends.

25. The turbocharger as in claim 18 further including an anti-friction material located between said outwardly projecting flange surfaces of said bearing carrier and the stationary housing surfaces.

* * * * *